(12) United States Patent
Simsek et al.

(10) Patent No.: US 10,749,351 B2
(45) Date of Patent: Aug. 18, 2020

(54) WIRELESS CONTAINER DATA COLLECTOR SYSTEM

(71) Applicant: Emerson Climate Technologies—Transportation Solutions ApS, Højbjerg (DK)

(72) Inventors: Yasin Simsek, Brabrand (DK); Jens Henrik Agersbæk, Horsens (DK); Gorm Aaen, Silkeborg (DK)

(73) Assignee: Emerson Climate Technologies—Transportation Solutions, Højbjerg (DK)

( * ) Notice: Subject to any disclaimer, the term of this patent is extended or adjusted under 35 U.S.C. 154(b) by 0 days.

(21) Appl. No.: 16/279,526

(22) Filed: Feb. 19, 2019

(65) Prior Publication Data
US 2019/0260215 A1    Aug. 22, 2019

Related U.S. Application Data

(60) Provisional application No. 62/633,358, filed on Feb. 21, 2018.

(51) Int. Cl.
*H02J 7/00* (2006.01)
*H04W 4/20* (2018.01)
(Continued)

(52) U.S. Cl.
CPC .............. *H02J 7/00* (2013.01); *G08B 21/182* (2013.01); *H02J 50/20* (2016.02); *H04W 4/20* (2013.01); *H02J 2207/20* (2020.01); *H04W 4/80* (2018.02)

(58) Field of Classification Search
CPC .......... H02J 7/00; H02J 50/20; G08B 21/182; H04W 4/20
(Continued)

(56) References Cited

U.S. PATENT DOCUMENTS

| 6,703,813 B1 * | 3/2004 | Vladislav ................ G05F 1/575 323/270 |
| 2008/0088281 A1 * | 4/2008 | Paul ...................... H02J 7/0003 320/141 |

(Continued)

FOREIGN PATENT DOCUMENTS

WO    WO-2017/075405 A1    5/2017

OTHER PUBLICATIONS

International Search Report and Written Opinion issued for the corresponding International Application No. PCT/IB2019/051435, dated Apr. 24, 2019.

*Primary Examiner* — Kerri L McNally
(74) *Attorney, Agent, or Firm* — Harness, Dickey & Pierce, P.L.C.

(57) ABSTRACT

Systems and methods are provided and include a charging circuit, a converter network, and a voltage regulator. The voltage regulator couples the charging circuit to the converter network. When the system is in the charging mode, the charging circuit is configured to receive a serial communication signal that charges the charging circuit. When the system is in the communication mode, the voltage regulator is configured to limit an amount of voltage discharge from the charging circuit, and the converter network is configured to receive the serial communication signal and convert the serial communication signal to a second signal having a second type. The second type has a different communication protocol than the serial communication signal. When the system is in the communication mode, the converter network is configured to transmit the second signal to a remote device.

20 Claims, 11 Drawing Sheets

(51) Int. Cl.
  *G08B 21/18* (2006.01)
  *H02J 50/20* (2016.01)
  *H04W 4/80* (2018.01)
(58) Field of Classification Search
  USPC .................................................. 340/539.1
  See application file for complete search history.

(56) References Cited

U.S. PATENT DOCUMENTS

2011/0070927 A1* 3/2011 Gilmore ................. H02J 7/025
 455/573
2015/0380973 A1* 12/2015 Scheb .................... H02J 7/025
 320/108
2017/0127196 A1* 5/2017 Blum ................... H04R 25/602

* cited by examiner

WIRELESS CONTAINER DATA COLLECTOR SYSTEM

CROSS-REFERENCE TO RELATED APPLICATIONS

This application claims the benefit of U.S. Provisional Application No. 62/633,358, filed on Feb. 21, 2018. The entire disclosure of the above application is incorporated herein by reference.

FIELD

The present disclosure relates to a wireless container data collector system, such as a refrigerated container or reefer.

BACKGROUND

This section provides background information related to the present disclosure and is not necessarily prior art.

Intermodal freight transport, which is the transportation of freight in an intermodal container using multiple modes of transportation and without any handling of the freight itself when changing modes, is complex, as it involves the movement of goods around the world. The intermodal container may be, for example, a refrigerated container or a reefer, which is an intermodal container that is refrigerated for the transportation of temperature sensitive cargo. Additionally, the intermodal container may include a container controller that provides real-time tracking information and monitors various operating characteristics of the intermodal container. As such, there is a need for efficiently acquiring the real-time tracking information and various operating characteristics of the intermodal container.

SUMMARY

This section provides a general summary of the disclosure, and this section is not a comprehensive disclosure of its full scope or all of its features.

A system is provided and includes a charging circuit, a converter network, and a voltage regulator. The voltage regulator couples the charging circuit to the converter network. The system is configured to operate in a charging mode and a communication mode. When the system is in the charging mode, the charging circuit is configured to receive a serial communication signal that charges the charging circuit. When the system is in the communication mode, the voltage regulator is configured to limit an amount of voltage discharge from the charging circuit. When the system is in the communication mode, the converter network is configured to receive the serial communication signal and convert the serial communication signal to a second signal having a second type, and the second type has a different communication protocol than the serial communication signal. When the system is in the communication mode, the converter network is configured to transmit the second signal to a remote device.

In some embodiments, the charging circuit is implemented by a battery-less circuit.

In some embodiments, the system is operable in an advertising Bluetooth low energy communication mode when a Bluetooth low energy advertising signal associated with a container includes an alarm value that indicates that an operating characteristic of the container is within a predefined tolerance.

In some embodiments, the system is operable in an advertising Bluetooth low energy communication mode when a Bluetooth low energy advertising signal associated with a container includes an alarm value that indicates that an operating characteristic of the container is not within a predefined tolerance.

In some embodiments, the system is operable in the communication mode in response to receiving an access request signal from the remote device.

In some embodiments, the system further comprises a controller, the controller including a processor that is configured to execute instructions stored in a nontransitory memory, the processor configured to provide the serial communication signal to (i) the charging circuit in response to the system operating in the charging mode and (ii) to the converter network in response to the system operating in the communication mode.

In some embodiments, the converter network is configured to determine whether the system is operating in one of the communication mode and the charging mode.

In some embodiments, the serial communication signal represents a plurality of operational characteristics of a container.

In some embodiments, the operational characteristics include at least one of an electric power consumption of the container, a suction of the container, a discharge temperature of the container, a pressure of a compressor of the container, a pressure of a condenser of the container, and an evaporator temperature of the container.

In some embodiments, the second type is a Bluetooth low energy signal.

In some embodiments, the voltage regulator includes a shunt regulator circuit and a low drop-out voltage regulator circuit.

In some embodiments the charging circuit includes a resistor-capacitor (RC) circuit.

In some embodiments, the remote device is configured to transmit a signal based on the second signal to at least one of a local monitoring system and a server using one of an ISO 10368 Power Line Interface, a power-line communication (PLC) protocol, and a cellular signal.

In some embodiments, the remote device is configured to transmit the signal using one of an ISO 10368 Power Line Interface, a power-line communication (PLC) protocol, and a cellular signal.

A method is also provided and includes receiving, using a charging circuit that is coupled to a converter network by a voltage regulator and while in a charging mode, a serial communication signal. The method also includes charging, using the serial communication signal and while in the charging mode, the charging circuit. The method also includes limiting, using the voltage regulator and while in a communication mode, an amount of voltage discharge from the charging circuit. The method also includes receiving, using the converter network and while in the communication mode, the serial communication signal. The method also includes converting, using the converter network and while in the communication mode, the serial communication signal to a second signal having a second type, the second type having a different communication protocol than the serial communication signal. The method also includes transmitting, using the converter network and while in the communication mode, the second signal to a remote device.

In some embodiments, the charging circuit is implemented by a battery-less circuit.

In some embodiments, the dongle is operable in an advertising Bluetooth low energy communication mode when a Bluetooth low energy advertising signal associated with a container includes an alarm value that indicates that an operating characteristic of the container is within a predefined tolerance.

In some embodiments, the dongle is operable in an advertising Bluetooth low energy communication mode when a Bluetooth low energy advertising signal associated with a container indicates that an operating characteristic of the container is not within a predefined tolerance.

In some embodiments, the dongle is operable in the communication mode in response to receiving an access request signal from the remote device.

In some embodiments, the method further comprises providing, using a processor that is configured to execute instructions stored in a nontransitory memory, the serial communication signal to (i) the charging circuit in response to the dongle operating in the charging mode and (ii) to the converter network in response to the dongle operating in the communication mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
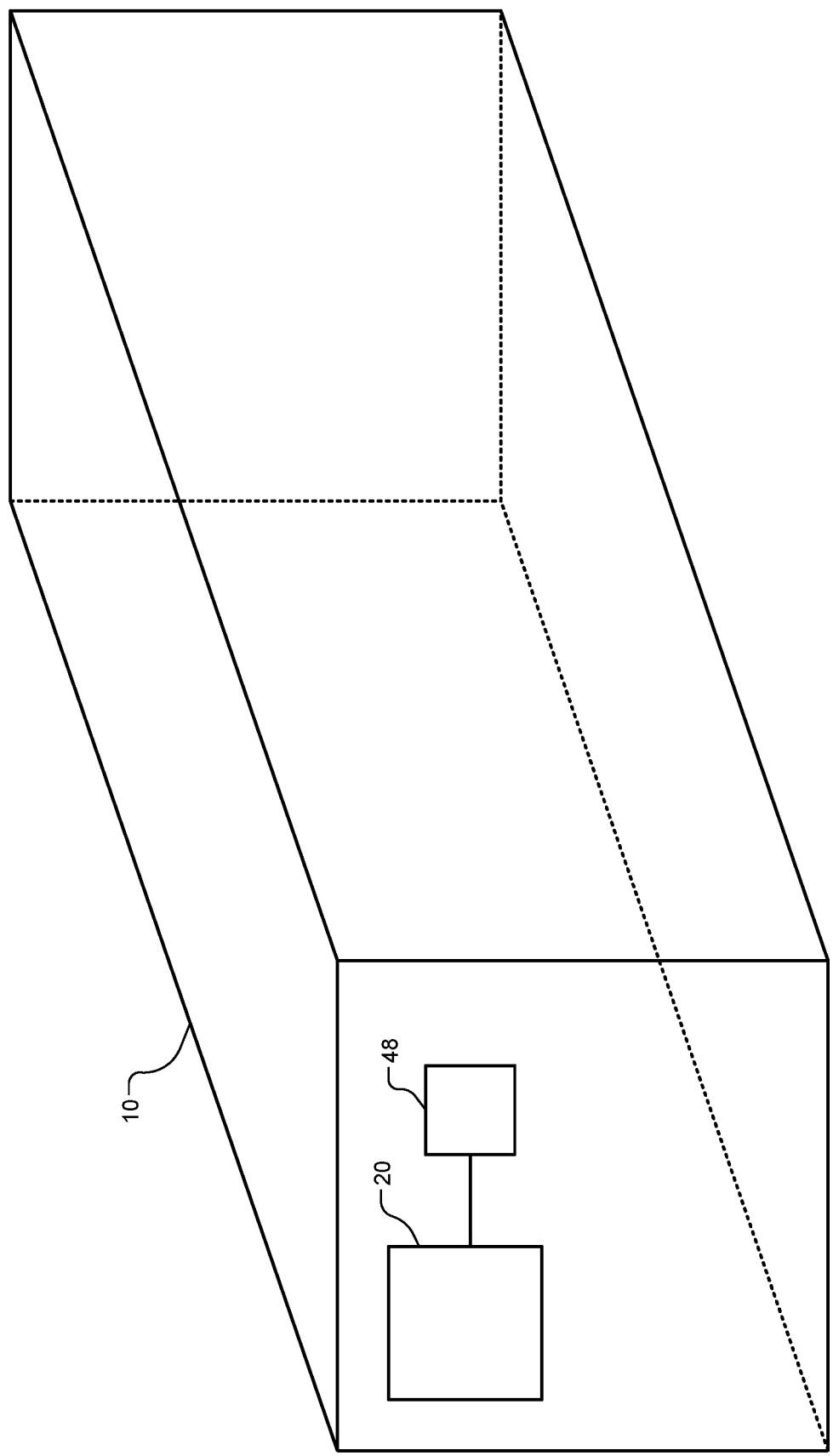
FIG. 1 is a container with a modem and a container controller according to the present disclosure.

With reference to FIG. 1, a container 10 with a modem 20 and a container controller 48 is shown. In one embodiment, the container 10 is a refrigerated container or a reefer, which is an intermodal container used in intermodal freight transport that is refrigerated for the transportation of temperature sensitive cargo. Alternatively, the container 10 may be other types of containers used for intermodal freight transport. The container 10 may further include a refrigeration unit that may be powered by diesel powered generators during intermodal transport. The refrigeration unit of the container 10 may be configured to set the temperature of the container 10 at a variety of temperatures between, for example, −65° C. and 40° C.

The modem 20, which may be a remote monitoring modem (RMM), may be configured to provide real-time remote monitoring and tracking information of the container 10 to a remote server or a cloud. Additionally, the modem 20 may be configured to provide, via the remote server or the cloud, centralized remote management of the container's operating conditions, alarms, events, settings, and positions. The modem 20 provides a variety of benefits for intermodal freight transport, including, for example, full transparency in a cooling chain; improved utilization of the container 10; reduced risk of potential cargo damage; reduction of operational costs due to less time-consuming manual inspections; reduction of unexpected events, such as container tampering, theft, diversion, or holdups during intermodal freight transport; improved safety of personnel; improved cargo documentation handling processes; optimization of the container operation with a reduced risk of human errors; and energy savings as a result of constant modem software updates that include the latest energy efficient programs. The modem 20 is described below in further detail with reference to FIG. 2 and FIG. 3.

The container controller 48 is configured to acquire sensor data from a plurality of sensors, and the sensor data represents a variety of operating characteristics of the container 10, such as electric power consumption, suction, discharge temperature, pressure of a compressor and condenser, evaporator temperature data, etc. Additionally, the container controller 48 may be configured to adjust the settings of a refrigeration system of the container 10 in response to a determination that one of the settings need to be modified. The container controller 48 is described below in further detail with reference to FIG. 2 and FIG. 3.

Figure 2:
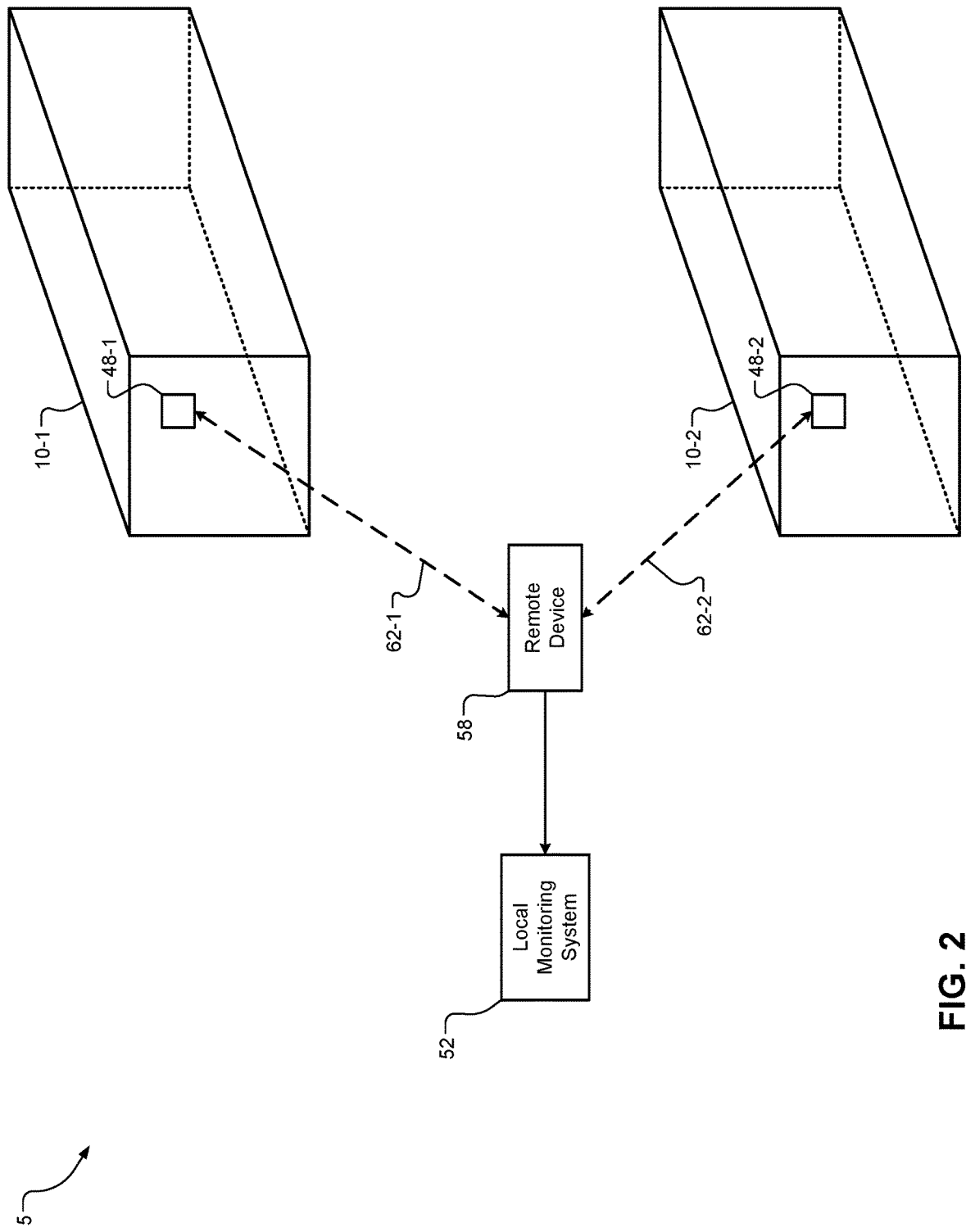
FIG. 2 is a detailed illustration of various communication links between a modem, a controller, a remote device, and a local monitoring system according to the present disclosure.

With reference to FIG. 2, a detailed illustration of various communication links between containers 10 of a container system 5, a remote device 58, and a local monitoring system 52 is shown. The container system 5 includes container 10-1 and container 10-2 (collectively referred to as containers 10). Each of the containers 10 include a respective container controller 48-1, 48-2 (collectively referred to as container controllers 48). While two containers 10 of the container system 5 are shown in this embodiment, the container system 5 may include any number of containers 10.

Furthermore, the container controllers 48 are configured to communicate with the remote device 58 via communication links 62-1, 62-2 (collectively referred to as communication links 62). Specifically, the container controllers 48 may transmit container data logs using a dongle (not shown) and via the communication links 62 based on an alarm flag of a corresponding Bluetooth low-energy (BLE) advertising signal and/or an access request originating from the remote device 58, as described below in further detail.

In one example embodiment, each of the containers 10 may be of a different type and, more specifically, may have different communication and/or data transmission protocols that are based on proprietary standards developed by a manufacturer of each of the containers 10. Accordingly, using the dongle (not shown) to transmit container data logs from the container controllers 48 enables the implementation of a ubiquitous, BLE-enabled device, such as a smartphone, as the remote device 58. Therefore, an operator using the remote device 58 can view the container data logs, modify settings, and/or transmit container data logs to the local monitoring system 52 regardless of the proprietary communication standards associated with each of the containers 10.

Figure 3:
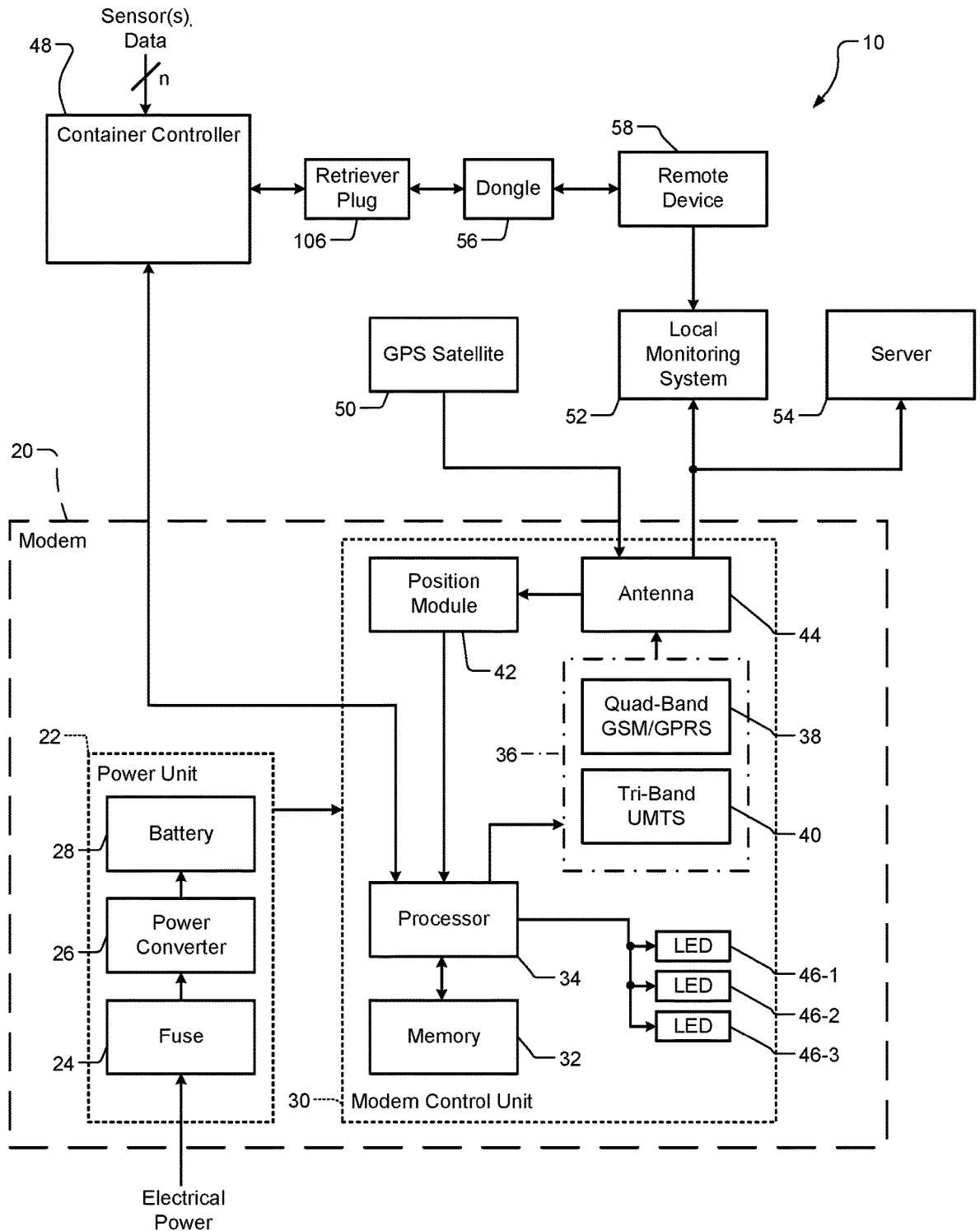
FIG. 3 is a detailed illustration of a modem, a container controller, and a remote device according to the present disclosure.

With reference to FIG. 3, a detailed illustration of the modem 20 and the container controller 48 is shown. In an example embodiment, the modem 20 may include a power unit 22, which may further include a fuse 24, a power converter 26, and a battery 28. Additionally, the modem 20 may include an modem control unit 30, which further includes a memory module 32, a processor 34, and a communication module 36 that includes a quad-band global system for mobile communication (quad-band GSM) module 38 and a tri-band universal mobile telecommunications system communication (tri-band UMTS) module 40. The modem control unit 30 may also include a position module 42, an antenna 44, and LEDs 46-1, 46-2, and 46-3 (collectively referred to as LEDs 46).

The modem power unit 22 is configured to provide power to the modem 20. In one embodiment, the modem power unit 22 receives electrical power from an AC voltage source, converts the electrical power from the AC voltage source to an electrical power within a product supply rating, and then provides the converted electrical power to the modem 20. Alternatively, the modem power unit 22 may be configured to receive electrical power from a DC voltage source.

In one embodiment, the power converter 26 receives electrical power from the AC voltage source through the fuse 24, which is configured to prevent excessive currents from being applied to the modem 20. In one embodiment, the fuse 24 may be selected such that a maximum current rating in which the fuse can safely break at a rated voltage does not exceed a threshold current, which may be, for example, 32 Amperes (A).

The power converter 26 may be configured to convert an AC signal from the AC power supply to a new AC signal that is provided to the modem control unit 30. In one embodiment, a transformer may be implemented to reduce the voltage from the AC power supply (e.g., $240V_{AC}$) to an input voltage that is less than or equal to a product supply rating voltage of the modem 20 (e.g., $24V_{AC}$). Additionally, the transformer may be configured to limit an amount of current from the AC power supply to a product supply current rating, which may be, for example, 1.5 A. Alternatively, the power converter 26 may be an indirect AC-AC converter that includes a rectifier, a DC link, and an inverter.

Alternatively, the power converter 26 may be configured to convert the AC signal from the AC power supply to a DC signal that is provided to the modem control unit 30. As an example, the power converter 26 may include the transformer to reduce the voltage from the AC power supply (e.g., $240V_{AC}$) to the input voltage within the product supply rating voltage of the modem 20 (e.g., $24V_{AC}$). Subsequently, a rectifier, which may be electrically coupled to the transformer, may be configured to convert the input voltage to into a DC signal (e.g., 24V). The rectifier may include four switching components, such as a diode, bipolar junction transistor (BJT), or metal-oxide-semiconductor field-effect transistor (MOSFET) arranged in a bridge configuration.

The battery 28, in response to receiving electrical power from the AC power supply through the fuse 24 and the power converter 26, may be configured to provide the input voltage to the modem control unit 30. Additionally, the battery 28 may provide power to other components that are not located in the modem control unit 30, which may include, for example, a plurality of sensors of the container 10.

The modem control unit 30 may be configured to provide, via the remote server or the cloud, real-time remote monitoring and tracking information of the container 10 and centralized remote management of the container's operating conditions, alarms, events, settings, and positions. The processor 34 may be configured to, based on instructions that are executable by the processor 34 and stored in the memory module 32, carry out the functionality described herein. The memory module 32 may be a non-transitory computer readable medium, such as a nonvolatile memory circuit, volatile memory circuit, magnetic storage media, and optical storage media.

In one embodiment, the processor 34 receives geospatial location data of the container 10 from a GPS satellite 50 via the antenna 44 and the position module 42. In response to the position module 42, which may include a GPS receiver, receiving geospatial data from the GPS satellite 50, the processor 34 may be configured to determine a GPS location of the container 10 and store the GPS location in the memory module 32.

In one embodiment, the processor 34 receives sensor data from a container controller 48 representing a variety of operating characteristics of the container 10, including electric power consumption, suction, discharge temperature, pressure of a compressor and condenser, evaporator temperature data, etc. Additionally, the processor 34 may be configured to provide a signal to the container controller 48 that is operable to adjust the settings of the refrigeration system of the container 10 in response to a determination of that the one of the settings need to be modified.

The container controller 48 and the processor 34 may communicate via a hardwired link and/or telemetric link. In one embodiment, the container controller 48 and the processor 34 may communicate via an ISO 10368 Power Line interface, which is the interface required to permit complying central monitoring and control systems employed by one carrier or terminal to interface and communicate with complying remote communication devices of differing manufacture and configuration used by other carriers and terminals. Thus, the processor 34 may be configured to receive operating conditions and alarms from a plurality of different container controllers 48, including, for example, CARRIER controllers, DAIKIN controllers, STARCOOL controllers, and THERMO KING controllers. Alternatively, the container controller 48 and the processor 34 may communicate via other industry standard interfaces that are set forth by, for example, the International Organization for Standardization.

In one embodiment, the processor 34 may be configured to instruct the communication module 36 to provide operational and location data of the container 10 to a local monitoring system 52 and/or a server 54, which may be a global monitoring server. As an example, the processor 34 may instruct the at least one of the quad-band GSM module 38 and the tri-band UMTS module 40 to transmit operational and location data of the container 10 to a local monitoring system 52. If a local monitoring system 52 is not present, the processor 34 may instruct the at least one of the quad-band GSM module 38 and the tri-band UMTS module 40 to transmit operational and location data of the container 10 to the server 54. The local monitoring system 52 and the server 54 may be configured to collect and store operational and location data transmitted by the modem 20. The local monitoring system 52 and the server 54 may also allow a user to remotely manage the container's operating conditions, alarms, events, settings, and positions. As an example, the local monitoring system 52 may be an EMERSON REFCON control system.

In one embodiment, the processor 34 may be configured to activate and deactivate the LEDs 46 in response to an operating condition of the container 10 and/or the modem 20. As an example, when the processor 34, via the position module 42, is unable to determine the GPS location of the container 10, LED 46-1 may be deactivated and will not emit light. Further, when the processor 34, via the position module 42, is able to determine the GPS location of the container 10, LED 46-1 may be activated and emit light. As another example, if the processor 34, via the position module 42, makes an incorrect determination of the GPS location of the container 10, then LED 46-1 may emit a flashing light to represent the incorrect determination. The LEDs 46 may also be activated and deactivated to represent other conditions of the modem 20 and/or the container 10, such as, for example, a status of the communication module 36 and the operating characteristics of the container 10.

The container controller 48 may also communicate with a communication interface device, also referred to as a dongle 56, which is configured to convert a communication format of the container controller 48 to a format that a ubiquitous device, such as the remote device 58, can receive and process. As an example, the container controller 48, without the dongle 56, may be configured to transmit container data logs to a peripheral device using serial communication methods, such as the Recommended Standard 232 (RS-232), which is a standard that defines electrical characteristics and timing of signals, the meaning of signals, and the physical size and pinout of connectors of the communication cables. As such, the peripheral device must be configured to receive data using the RS-232 protocol. However, the dongle 56, which may be plugged into a retriever plug 106 of the container 10, converts the data transmission method from a serial communication method to, for example, a Bluetooth transmission method. As a specific example, the dongle 56 may convert the RS-232 communication to the BLE protocol. In alternative embodiments, the dongle 56 may convert the RS-232 communication to other telemetric and/or hardwire communication methods. The dongle 56 is described below in further detail with reference to FIG. 4, FIGS. 5A-5B, and FIGS. 6A-6C, and the retriever plug 106 is described below in further detail with reference to FIGS. 6A-6C.

The container controller 48 may transmit container data logs using the dongle 56 based on an alarm flag of a BLE advertising signal. As an example, the container controllers 48 are configured to, using the dongle 56, continuously generate and transmit the BLE advertising signals. The BLE advertising signals may include information associated with an identification of the container, a set of the operational characteristics, and an alarm flag. The set of the operational characteristics may be defined by critical operational characteristics of the container 10, and the alarm flag may be based on the values of the critical operational characteristics. As an example, the alarm flag of the BLE advertising signal may be set to a high value if one of the critical operational characteristics has a value outside of a predefined tolerance. Accordingly, if the alarm flag of the BLE advertising signal is set to a high value, the remote device 58 may then connect to the container controller 48 using the dongle 56 and receive the container data logs, which include all of the operational characteristics of the container 10, from the container controller 48.

Additionally or alternatively, the container controller 48 may transmit container data logs using the dongle 56 in response to an access request from the remote device 58. As an example, an operator of the remote device 58, such as a service technician, may transmit a signal to the container controller 48 with a request to obtain container data logs of the container 10. In response to receiving the request, the container controller 48 may transmit the container data log using the dongle 56 to the remote device 58. Subsequently, the service technician may view the container data log, modify settings, and/or transmit the container data logs to the local monitoring system 52.

The remote device 58 is a device that is configured to receive and process container data logs sent from the container controller 48 using the dongle 56. Using the above example, the remote device 58 may be any Bluetooth-enabled communication computing device, such as a desktop computer, laptop, smart phone, smart watch, wearable electronic device, tablet device, or other similar computing device. Furthermore, if the remote device 58 is a smart phone or other similar device, the remote device 58 may be configured to receive and display the container data logs using an application executing on the remote device 58. Accordingly, the application may be executable by a processor of the remote device 58, and the processor is configured to execute instructions stored in a non-transitory memory, such as a read-only memory (ROM) and/or random-access memory (RAM).

Additionally, the remote device 58 is configured to transmit the container data logs to the local monitoring system 52. As an example, the remote device 58 may transmit the container data logs to the local monitoring system 52 via a hardwire connection, such as the ISO 10368 Power Line interface or a power-line communication (PLC) protocol. Additionally or alternatively, the remote device 58 may transmit the container data logs to the local monitoring system 52 via a telemetric link, such as a cellular signal, and a Bluetooth signal. Furthermore, the remote device 58 may transmit the container data logs to the local monitoring system 52 using a local area network (LAN), the Internet, a wide area network (WAN), or any combination thereof.

Figure 4:
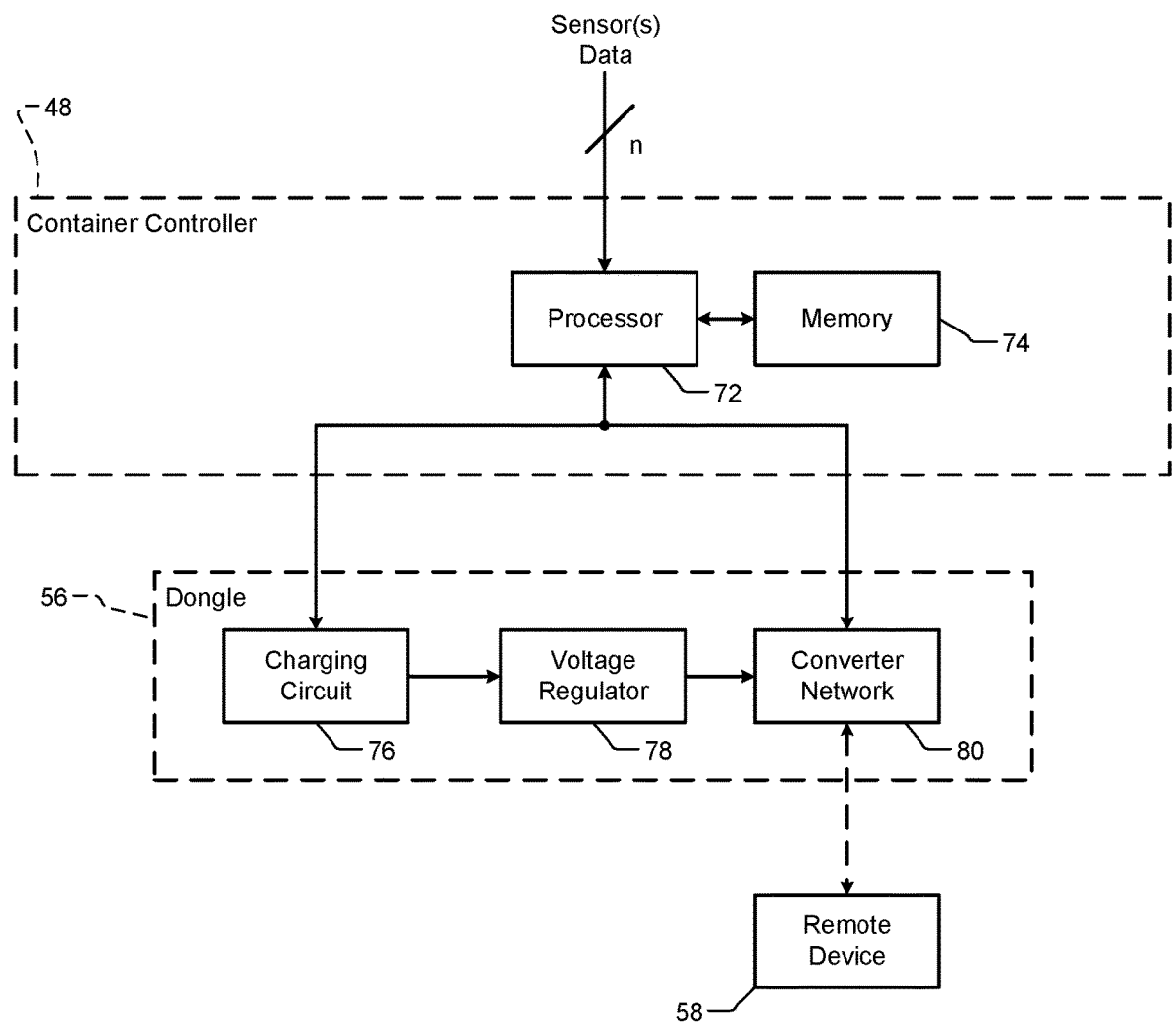
FIG. 4 is a block diagram of an example dongle according to the present disclosure.

With reference to FIG. 4, a block diagram of the container controller 48 and the dongle 56 is shown. The container controller 48 includes the dongle 56 and a processor 72 that is configured to, based on instructions that are executable by the processor 72 and stored in the memory module 74 (e.g., a nontransitory computer-readable medium, such as a RAM and/or ROM), carry out the functionality described herein. As an example, the instructions may include generating serial communication signals, such as RS-232 signals, based on the sensor data received by the plurality of sensors. As another example, the instructions may include transmitting the serial communication signals to a converter network 80 of the dongle 56, and the converter network 80 may be configured to convert serial communication signals to a signal that can be received and processed by the remote device 58, such as a BLE signal. The converter network 80 may be implemented by various integrated circuits that are operable to convert serial communication signals to BLE signals, such as a DA14585 integrated circuit provided by Dialog Semiconductor, PLC.

In addition to transmitting the serial communication signal to the converter network 80 of the dongle, the instructions may include transmitting the serial communication signal to a charging circuit 76 of the dongle 56. The charging circuit 76 may be any circuit that is configured to store energy in response to receiving a signal from the processor 72 and discharge energy in response to being disconnected from the processor 72. In one embodiment, the charging circuit 76 may be implemented by a resistor-capacitor (RC) circuit, and the RC circuit may include a resistor that is configured to provide a path for charging a capacitor of the RC circuit. Additionally, the RC circuit may include a diode that couples the resistor and the capacitor, and the diode may be configured to control the direction of the voltage discharge of the capacitor. Additionally or alternatively, the charging circuit 76 may be implemented by other charging circuits, such as a resistor-inductor (RL) circuit, integrated circuits that are configured to store and discharge energy, and/or other circuits that are configured to store and discharge energy.

The charging circuit 76 may be coupled to the converter network 80 by a voltage regulator 78. The voltage regulator 78 may be configured to regulate the magnitude of the voltage discharge of the charging circuit 76. The voltage regulator 78 is described below in further detail with reference to FIGS. 5A-5B.

In one embodiment, the charging circuit 76 is configured to use the serial communication signal in order to power the converter network 80. Accordingly, the dongle 56 may be a portable, self-powering device may be coupled to the retriever plug 106 of the container 10 in order to function. Coupling the dongle 56 to the retriever plug 106 of the container 10 is described below in further detail with reference to FIGS. 6A-6C. Furthermore, the dongle 56 does not require a battery or an external power supply to operate, thereby making the dongle 56 easy to integrate with the container controller 48 and both mechanically and electrically robust.

In one embodiment, the processor 72 transmits serial communication signals to each of the converter network 80 and the charging circuit 76. As an example, the dongle 56 may initially be operable in a charging mode. During the charging mode, a continuous stop bit is transmitted from the processor 72 to the charging circuit 76. As the continuous stop bit is provided to the charging circuit 76, the charging circuit 76 charges until it reaches a voltage limit designated by the voltage regulator 78. As an example, if the charging circuit 76 is implemented by the RC circuit, the capacitor of the RC circuit charges until it reaches the voltage limit designated by the voltage regulator 78, such as −2.7V.

Once the charging circuit 76 is sufficiently charged, the processor 72 is configured to discontinue supplying the serial communication signal to the charging circuit 76, and the dongle 56 may transition to a controller communication mode. During the controller communication mode, the processor 72 is configured to generate and transmit serial communication signals based on the information obtained by the plurality of sensors (e.g., operational characteristics and/or container data logs) to the converter network 80, as described above. The processor 72 may utilize the stored energy of the charging circuit 76 in order to carry out the process of generating and transmitting the serial communication signals to the converter network 80. Once the stored energy of the charging circuit 76 is depleted or nearly depleted, the dongle 56 may subsequently transition to the charging mode in order recharge the charging circuit 76 and resume the generation and transmission of serial communication signals. Accordingly, the processor 72 may be configured to only generate and transmit the serial communication signals when the dongle 56 is operating in the controller communication mode.

In addition to transitioning to the controller communication mode once the charging circuit 76 is initially charged, the dongle 56 may also transition to and remain in a BLE communication mode. The dongle 56 may remain in the BLE communication mode subsequent to the initial charging of the charging circuit 76 due to the high efficiency and low power requirements of the converter network 80. During the BLE communication mode, the converter network 80 is configured to convert the serial communication signals to, for example, BLE signals.

As a specific example, during an advertising BLE communication mode, the converter network 80 is configured to broadcast a BLE advertising signal representing information associated with an identification of the container, a set of the operational characteristics, and an alarm flag, as described above. Furthermore, when the BLE advertising signals include an alarm flag, as described above, the instructions may include switching from the advertising BLE communication mode to a connecting BLE communication mode. During the connecting BLE communication mode, the processor 72 may initially send a start bit to the converter network 80, thereby enabling the converter network 80 to read incoming bits corresponding to the container data logs. Moreover, during the connecting BLE communication mode, the processor 72 may discontinue supplying the serial communication signal to the charging circuit 76. Once the serial communication signal supply is discontinued, the charging circuit 76 may discharge its voltage to the converter network 80 via the voltage regulator 78, thereby providing the converter network 80 the requisite supply voltage necessary to read the incoming serial communication signal and convert it into a BLE signal. Once the container data logs, which may be originally represented by the serial communication signal, are received by the remote device 58 via the converter network 80, the container controller 48 and the remote device 58 are disconnected. Subsequently, the instructions may include switching from the connecting BLE communication mode to the advertising BLE communication mode.

Additionally, while the dongle 56 is operating in the connecting BLE communication mode, the dongle 56 may be configured to receive data from the remote device 58 in order to, for example, update software of the container controller 48 and/or the dongle 56.

Figure 5A:
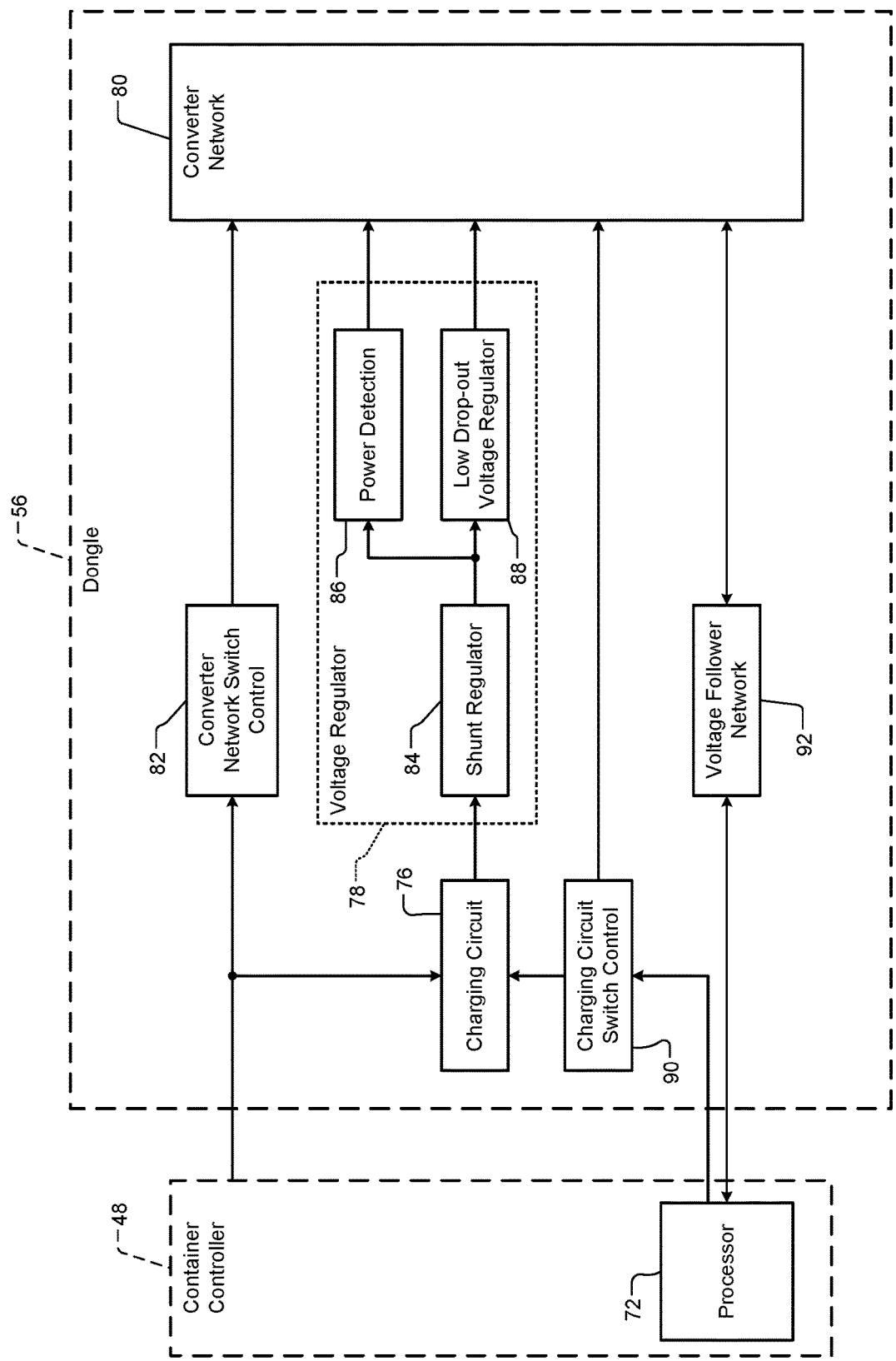
FIGS. 5A-5B are block diagrams of an example dongle according to the present disclosure.

With reference to FIG. 5A, a detailed block diagram of the dongle 56 is shown. In this example embodiment, the charging circuit 76 is electrically coupled to the processor 72 by a charging circuit switch control module 90. Additionally, the converter network 80 is electrically coupled to the container controller 48 and the processor 72 by the converter network switch control module 82 and the voltage follower network 92, respectively. Furthermore, in this example embodiment, the voltage regulator 78 includes a shunt regulator 84, a power detection module 86, and a low drop-out voltage regulator 88.

The converter network switch control module 82 is configured to selectively activate the converter network 80 based on a state of the container controller 48. The converter network switch control module 82 may be implemented by, for example, an n-channel metal-oxide-semiconductor field-effect transistor (MOSFET). As an example, if the container controller 48 is on, the converter network switch control module 82 is configured to electrically couple the container controller 48 and the converter network 80. As such, when the container controller 48 is on, the container controller 48 may be configured to provide a supply voltage and/or reference voltage to the converter network 80, thereby activating the converter network 80. Furthermore, if the container controller 48 is off, the converter network switch control module 82 is configured to disconnect the container controller 48 from the converter network 80.

The voltage follower network 92 is configured to electrically couple the processor 72 and the converter network 80, thereby enabling serial communications generated by the processor 72 to be provided to the converter network 80 for conversion into BLE signals. The voltage follower network 92 may be implemented by at least one operational amplifier (op-amp) that electrically couples the processor 72 and the converter network 80 and is further configured to minimize current draw between the container controller 48 and the converter network 80. As an example, when the dongle 56 is in the connecting BLE communication mode, the processor 72 may initially send a start bit to the converter network 80 via the voltage follower network 92, thereby enabling the converter network 80 to read incoming bits of the serial communication signal corresponding to the container data logs. Additionally, the processor 72 provides the serial communication signal that is generated based on the sensor data to the converter network 80 via the voltage follower network 92.

The charging circuit switch control module 90 is configured to selectively activate the charging circuit 76 based on a mode of the dongle 56. The charging circuit switch control module 90 may be implemented by, for example, a field-effect-transistor (FET). As an example, during the charging mode, the charging circuit switch control module 90 electrically couples the processor 72 and the charging circuit 76 and, therefore, the serial communication signal is configured to charge the capacitor of the charging circuit 76, as described above. Furthermore, once the dongle 56 is set to the BLE communication mode and the controller communication mode, the charging circuit switch control module 90 disconnects the processor 72 from the charging circuit 76 and, therefore, the processor 72 discontinues supplying serial communications to the charging circuit 76. Subsequently, the charging circuit 76 may discharge its voltage to the converter network 80 via the voltage regulator 78, thereby providing the converter network 80 the requisite supply voltage necessary to read the incoming serial communication signal and convert it into a BLE signal.

As described above, when the charging circuit 76 is implemented by the RC circuit, the voltage regulator 78 may be configured to regulate the magnitude of the voltage discharge of the capacitor of the RC circuit. As an example, a shunt regulator 84 may be configured to prevent the voltage discharge of the capacitor of the RC circuit from exceeding a predefined voltage. As an example, the shunt regulator 84 may be implemented by an ATL431 shunt regulator provided by Texas Instruments®, Inc., and the shunt regulator 84 may be configured to prevent the voltage discharge of the capacitor of the RC circuit from exceeding a magnitude of 5 volts.

The output voltage of the shunt regulator 84 may then be provided to the low drop-out voltage regulator 88, which may be implemented by an LD39100 integrated circuit. The low drop-out voltage regulator 88 may be configured to provide a low drop-out voltage of the dongle 56. Accordingly, the low drop-out voltage regulator 88 improves the efficiency of the dongle 56 and may provide a constant output voltage to the converter network 80 regardless of the magnitude of the voltage discharge of the charging circuit 76.

Additionally, the voltage regulator 78 may include a power detection module 88 that is configured to monitor an amount of power that is being output by the shunt regulator 84, and a signal based on the amount of power may be provided to the converter network 80.

Figure 5B:
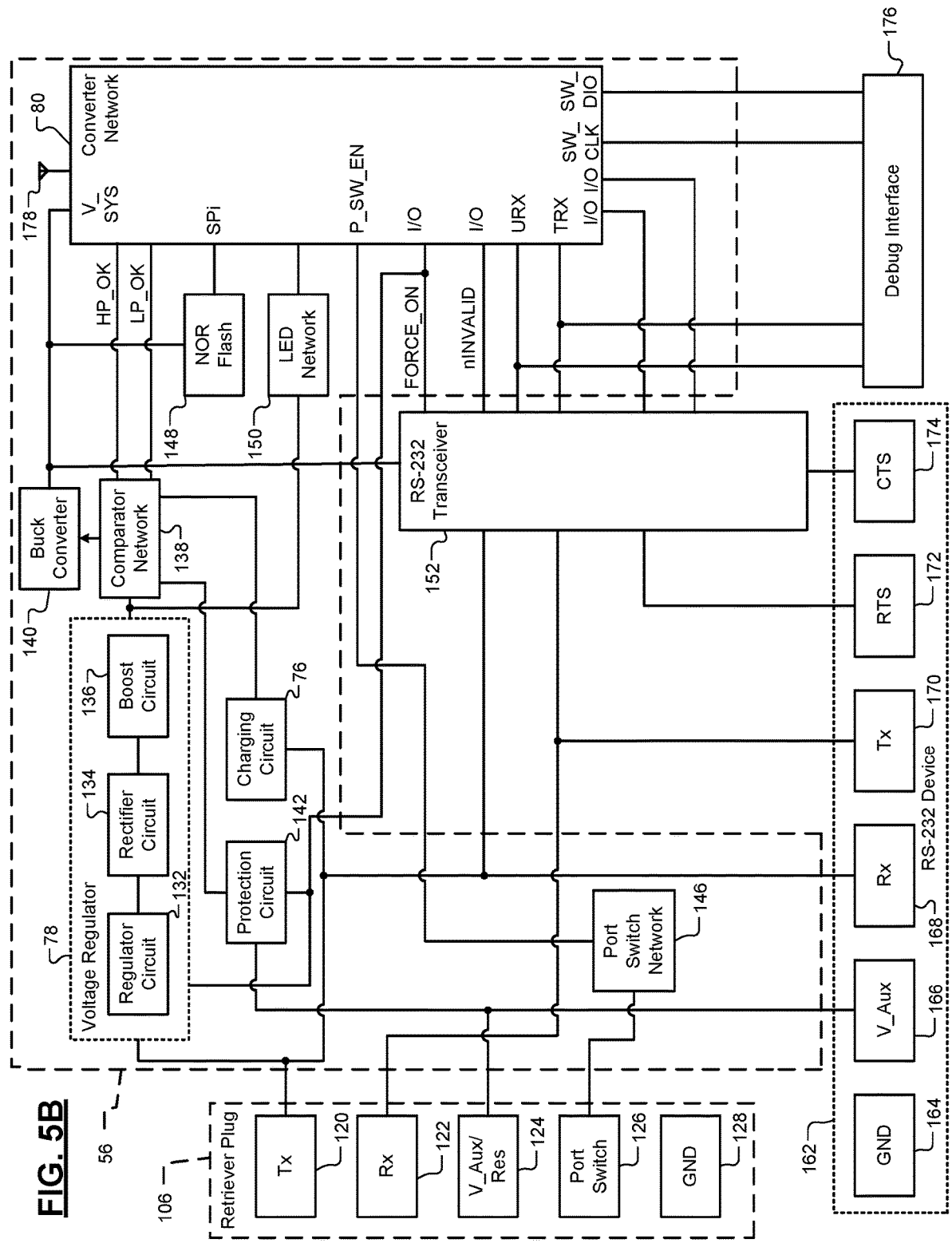

With reference to FIG. 5B, another block diagram illustrating example electrical connections between the dongle 56, the retriever plug 106, an RS-232 device 162, an RS-232 transceiver 152, and a debug interface 176 are shown. The retriever plug 106 may include a Tx port 120, an Rx port 122, an auxiliary port 124, a port switch 126, and a ground port 128. The dongle 56 may include the charging circuit 76, the voltage regulator 78, the converter network 80, a comparator network 138, a buck converter 140, a protection circuit 142, a port switch network 146, a NOR flash memory module 148, and an LED network 150. The container controller 48 may include the RS-232 device 162, which may include a ground port 164, an auxiliary port 166, an Rx port 168, a Tx port 170, a request to send (RTS) port 172, and a clear to send (CTS) port 174.

As described above with reference to FIG. 4, while the dongle 56 is in the controller communication mode, the processor 72 is configured to generate serial communication signals, such as RS-232 signals, based on the sensor data received by the plurality of sensors and transmit the serial communication signals to the converter network 80 of the dongle 56. As an example, in order to generate RS-232 signals, the processor 72 may instruct the RS-232 device 162 to transmit RS-232 signals based on the sensor data using the Rx port 168, the Tx port 170, the RTS port 172, and the CTS port 174. Initially, the RS-232 device 162 may provide an interrupt signal to an RS-232 transceiver 152 using the RTS port 172. In response to the RS-232 transceiver 152 receiving the interrupt signal and, for example, the RS-232 transceiver 152 having sufficient buffer capacity, the RS-232 transceiver 152 provides a start signal to the CTS port 174 of the RS-232 device 162. In response to receiving the start signal, the RS-232 device 162 begins transmitting signals corresponding to the sensor data to the dongle 56.

While the dongle 56 is in the BLE communication mode, the converter network 80 is configured to receive the RS-232 signals from the RS-232 device 162 and convert the RS-232 signals into BLE signals. As an example, the RS-232 device 162 may be configured to provide the RS-232 signals to the converter network 80 via the RS-232 transceiver 152. The converter network 80, which may be implemented by a DA14585 integrated circuit provided by Dialog Semiconductor®, PLC, subsequently converts the RS-232 signal to a BLE signal and transmits the BLE signal to the remote device 58 via the antenna 178.

While the dongle 56 is in the charging mode, the charging circuit 76 and the voltage regulator 78 may receive a voltage signal via the Tx port 120. The charging circuit 76 may be any circuit that is configured to store energy in response to receiving a signal from the Tx port 120. In one embodiment, the charging circuit 76 may be implemented by an RC circuit and may include a diode that controls the direction of the voltage discharge of the capacitor. The charging circuit 76 may also include switching elements that are configured to selectively activate the charging circuit 76 based on an operation mode of the dongle 56. In other embodiments, the charging circuit 76 may be implemented by other charging circuits, such as an RL circuit or an integrated circuit that is configured to store and discharge energy.

Furthermore, while the dongle 56 is in the charging mode and in response to receiving the voltage signal from the Tx port 120, the voltage regulator 78 may provide a reference voltage to the comparator network 138. As an example, a regulator circuit 132 of the voltage regulator 78 may be configured to limit the voltage value of the signals to a predefined voltage value, such as −2.7V. A rectifier circuit 134, which may be implemented by an H-bridge circuit, may then convert an AC voltage signal to a DC voltage signal. A boost circuit 136, which may be implemented by an AP3015 integrated circuit provided by Texas Instruments®, Inc., may then convert the polarity and voltage magnitude of the signal.

Subsequently, the converted voltage signal (e.g., a 4.5V DC voltage signal) is provided to a reference voltage input of the comparator network 138. Accordingly, the comparator network 138 may be configured to provide a plurality of outputs directly to the converter network 80 based on the reference voltage and a voltage of the charging circuit. In one embodiment, the comparator network 138 may be implemented by two comparator operational amplifiers that are configured to produce a two-state output (HP_OK and LP_OK) that indicates whether the voltage discharge value of the charging circuit 76 is greater than the reference voltage value. Based on at least one value of the plurality of the outputs of the comparator network 138, the converter network 80 sets the operation mode of the dongle 56, as described below in further detail with reference to FIG. 7B.

Additionally or alternatively, in response to receiving the voltage discharge from the charging circuit 76 and the reference voltage, the comparator network 138 is configured to selectively output a voltage to the buck converter 140. In response to the buck converter 140 receiving the voltage from the comparator network 138, the buck converter 140 is configured to reduce the voltage magnitude to a value that is configured to provide a supply voltage for the converter network 80, the NOR flash memory module 148, and the RS-232 transceiver 152. As an example, the buck converter 140 is configured to reduce the voltage output from the comparator network 138 to 2.5V. Furthermore, the buck converter 140 may be implemented by a TPS62740 integrated circuit provided by Texas Instruments®, Inc.

Additionally or alternatively, the output of voltage regulator 78 may be provided to the LED network 150. Furthermore, various light-emitting diodes (LED) of the LED network 150 may be activated based on the operation mode of the dongle 56.

Additionally or alternatively, an output of the auxiliary port 124 may be provided to the buck converter 140 and/or the protection circuit 142. The protection circuit 142 may be configured to filter voltage spikes from the auxiliary port 124, and the protection circuit 142 may be implemented by various passive elements to filter the voltage spikes. Furthermore, the auxiliary port 124 and the debug interface 176 may be implemented for specialized utilization of the dongle 56 and may be inactive and/or not generate voltage signals when the dongle 56 is in the controller communication mode and/or the BLE communication mode.

Additionally or alternatively, the port switch network 146 and the port switch port 126 may be implemented and utilized when certain container controllers 48 are used. As an example, port switch network 146 and the port switch port 126 may be utilized when the container controller 48 is implemented by a THERMAKING® MP-3000 controller.

Figure 6A:
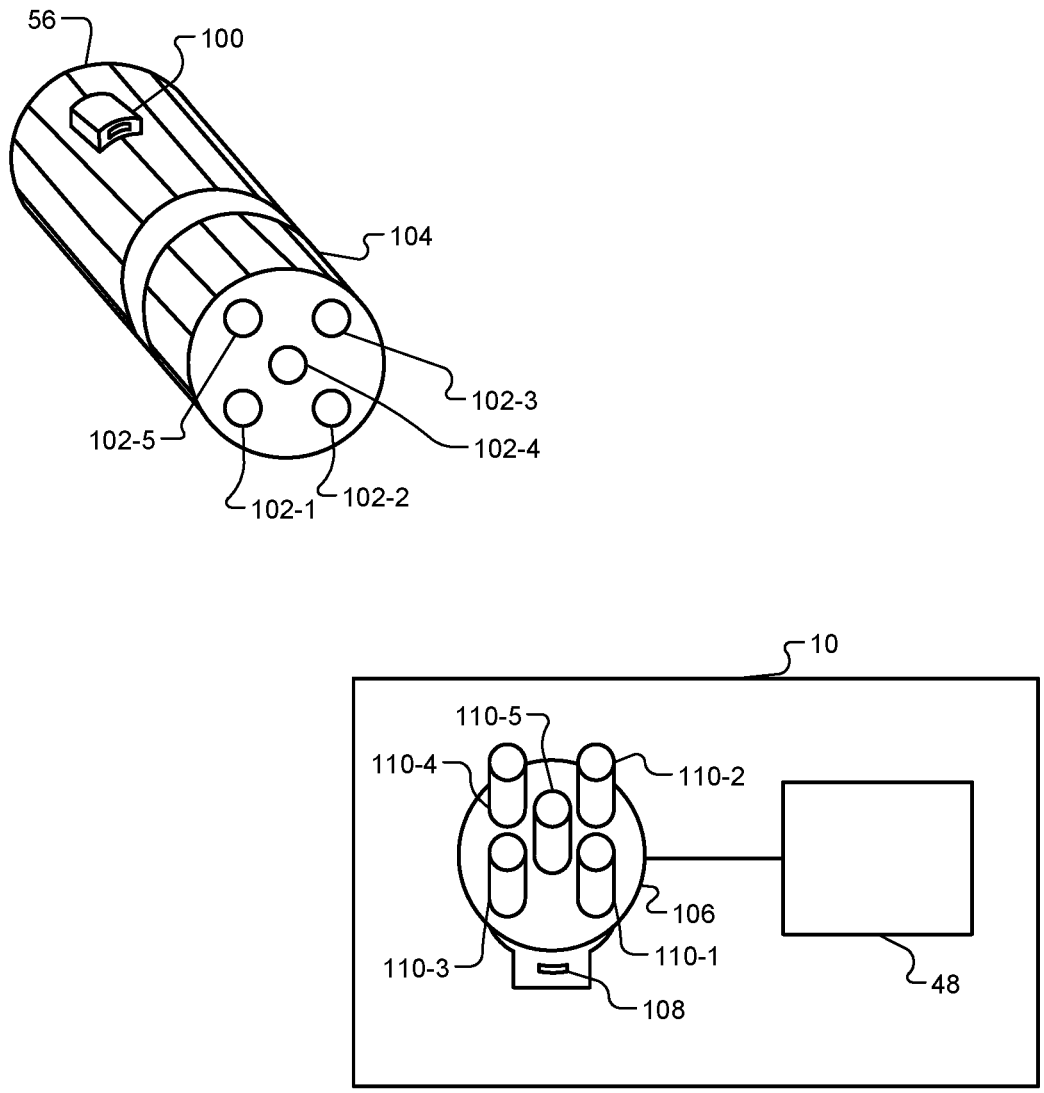
FIGS. 6A-6C are detailed illustrations of an example dongle according to the present disclosure.
Figure 6B:
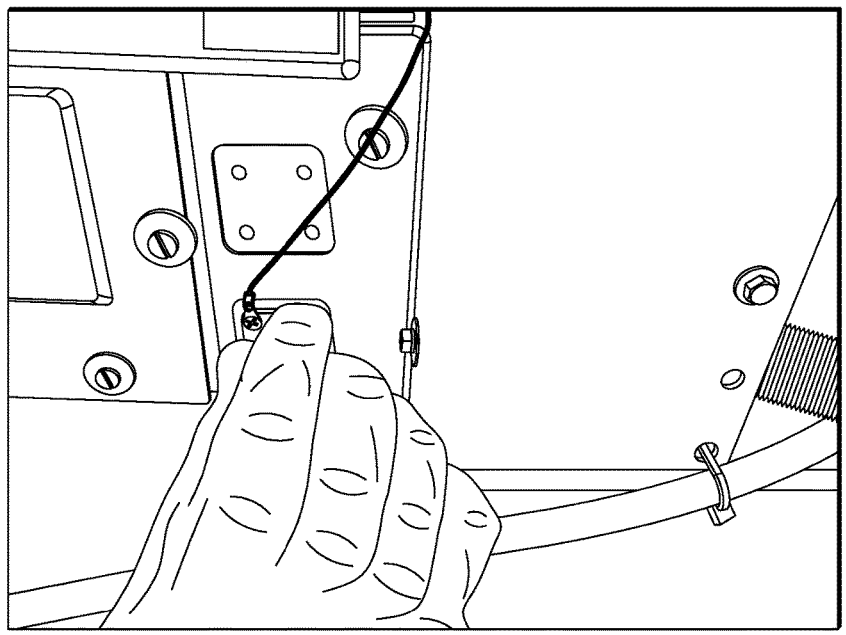
Figure 6B:
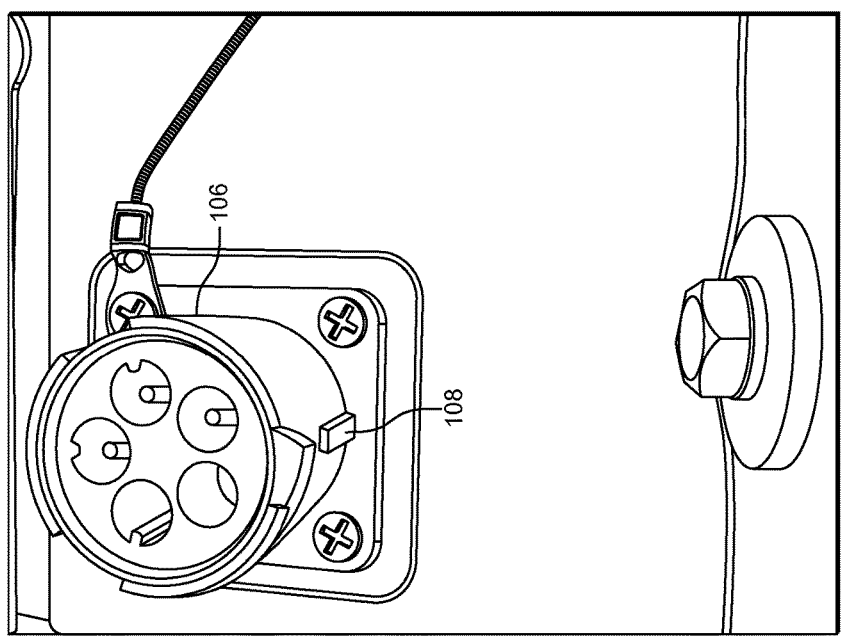
Figure 6C:
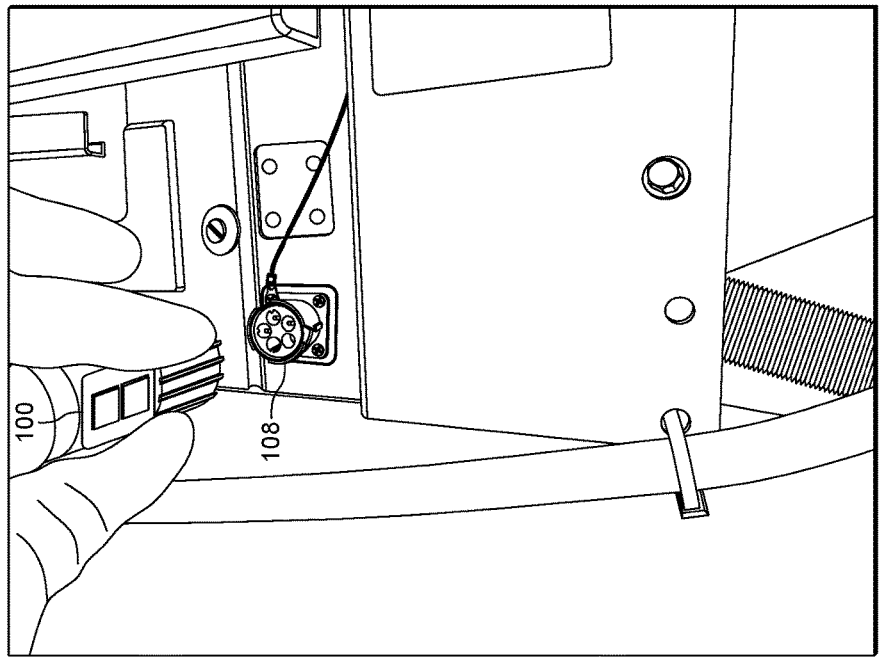
Figure 6C:
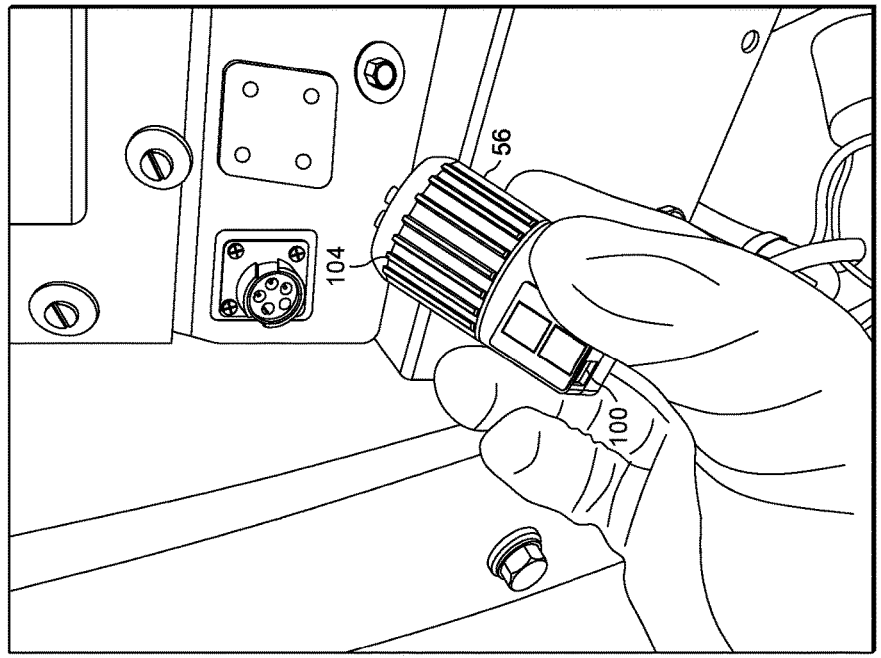

With reference to FIGS. 6A-6C, an illustration of the dongle 56 is shown. In this example, the dongle 56 includes a notch 100, retriever plug slots 102-1, 102-2, 102-3, 102-4, 102-5 (referred to collectively as retriever plug slots 102), and a locking ring 104. The container 10 includes the retriever plug 106, which includes prongs 110-1, 110-2, 110-3, 110-4, 110-5 (referred to collectively as prongs 110) and retriever plug notch 108. The container controller 48 may establish an electrical communication with the remote device 58, such as communication link 62, when the dongle 56 is connected to the retriever plug 106, thereby enabling the container controller 48 to transmit container data logs to the remote device 58. Specifically, the dongle 56 may be connected to the retriever plug 106 when the prongs 110 of the retriever plug 106 are received by the retriever plug slots 102 of the dongle 56. An example illustration of the dongle 56 is shown in FIG. 6A.

As an example, a service technician may couple the dongle 56 to the container controller 48 of via a retriever plug 106 of the container 10. Specifically, the service technician may first identify the location of the retriever plug notch 108, as shown in FIG. 6B. Subsequently, the service technician may locate the notch 100 of the dongle 56 and then align the notch 100 and the retriever plug notch 108, as shown in FIG. 6C. Once the notch 100 and the retriever plug notch 108 are aligned, the service technician may attach the dongle 56 to the retriever plug 106 such that prongs 110 of the retriever plug 106 are received within the retriever plug slots 102. The service technician may then rotate the locking ring 104 until the dongle 56 is securely fastened to the retriever plug 106. The tactile orientation feedback features of the dongle 56 enable the service technician to easily establish the electrical communication between the container controller 48 and the remote device 58 using one hand, while wearing a glove, and/or in a low lighting environment. Because the dongle 56 includes the identifiable notch 100, the technician may be able to feel the location of the notch 100 and conveniently plug the dongle 56 into the retriever plug 106, matching the notch 100 to the retriever plug notch 108, in a one-handed operation.

Figure 7A:
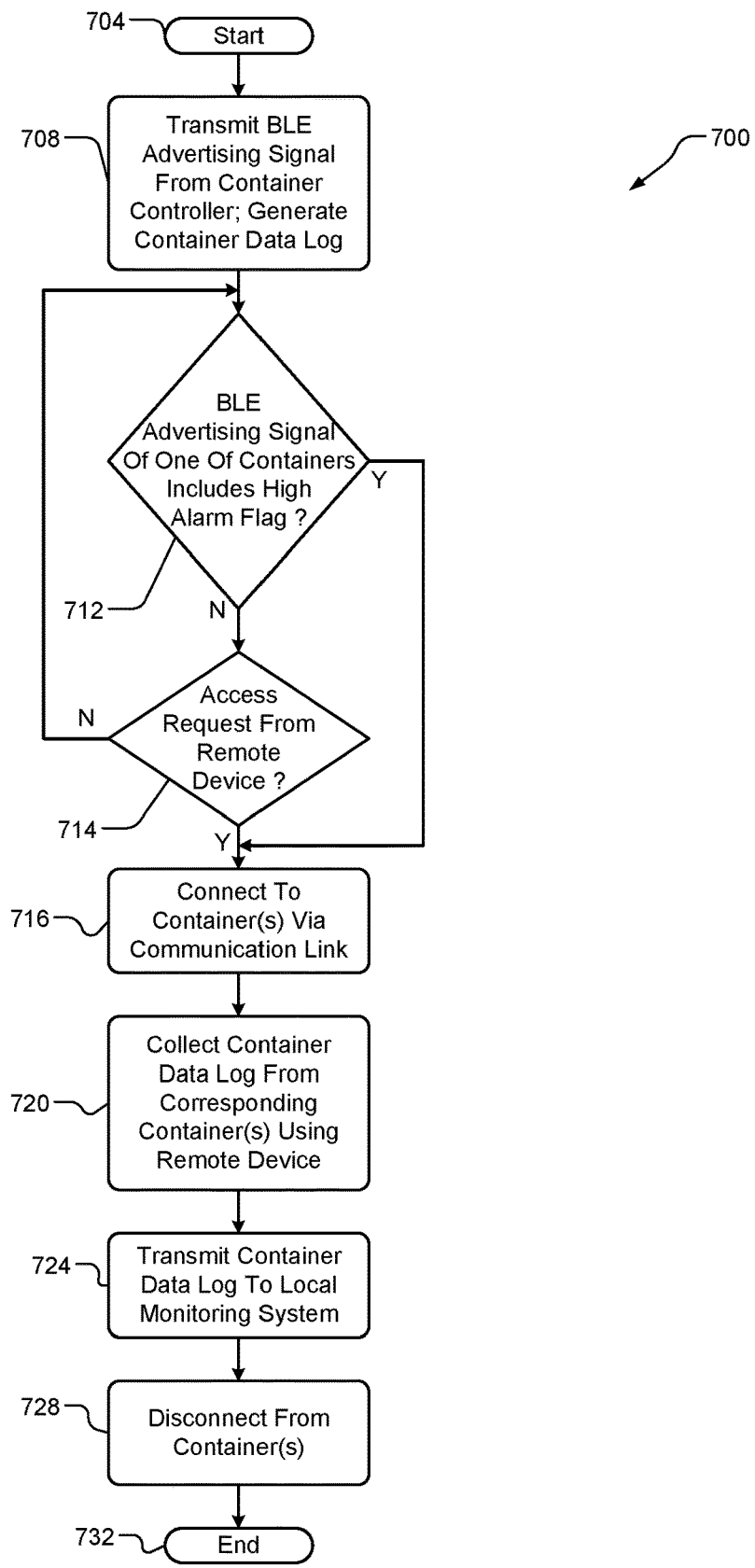
FIGS. 7A-7B are flowcharts of example algorithms for transmitting information from the container controller to the remote device according to the present disclosure.

With reference to FIG. 7A, a flowchart describing an example control algorithm 700 for transmitting information from the container controller 48 to the local monitoring system 52 is shown. The control algorithm 700 begins at 704 when, for example, the remote device 58 is turned on by an operator of the remote device 58. At 708, the control algorithm 700 transmits, using the container controller 48 of each of the containers 10, the BLE advertising signal. Additionally, the container controllers 48 generate container data logs based on operational characteristics of the container 10, as described above. At 712, the control algorithm 700 determines, using the container controller 48 of each of the containers 10, whether the BLE advertising signal of one of the containers 10 includes an alarm flag. If so, the control algorithm 700 proceeds to 716; otherwise, the control algorithm 700 proceeds to 714. At 714, the control algorithm 700 determines whether an access request was generated by the remote device 58. As an example, a service technician using the remote device 58 may generate a request if he or she desires to obtain a container data log associated with one of the containers 10. If so, the control algorithm 700 proceeds to 716; otherwise, the control algorithm 700 proceeds to 712.

At 716, the control algorithm 700 connects, via the communication links 62, to each of the containers 10 that include the BLE advertising signal with the alarm flag. As an example, the remote device 58 may connect to each of the container controllers 48 of the identified containers 10 using the dongle 56 of each of the container controllers 48, as described above with reference to FIG. 3. At 720, the control algorithm 700 collects, using the remote device 58, a data log associated with the container 10 that includes an alarm flag in the corresponding BLE header data. At 724, the control algorithm 700 transmits, using the remote device 58, the data log to the local monitoring system 52. At 728, the control algorithm 700 disconnects the remote device 58 from the containers 10. The control algorithm 700 then ends at 732.

Figure 7B:
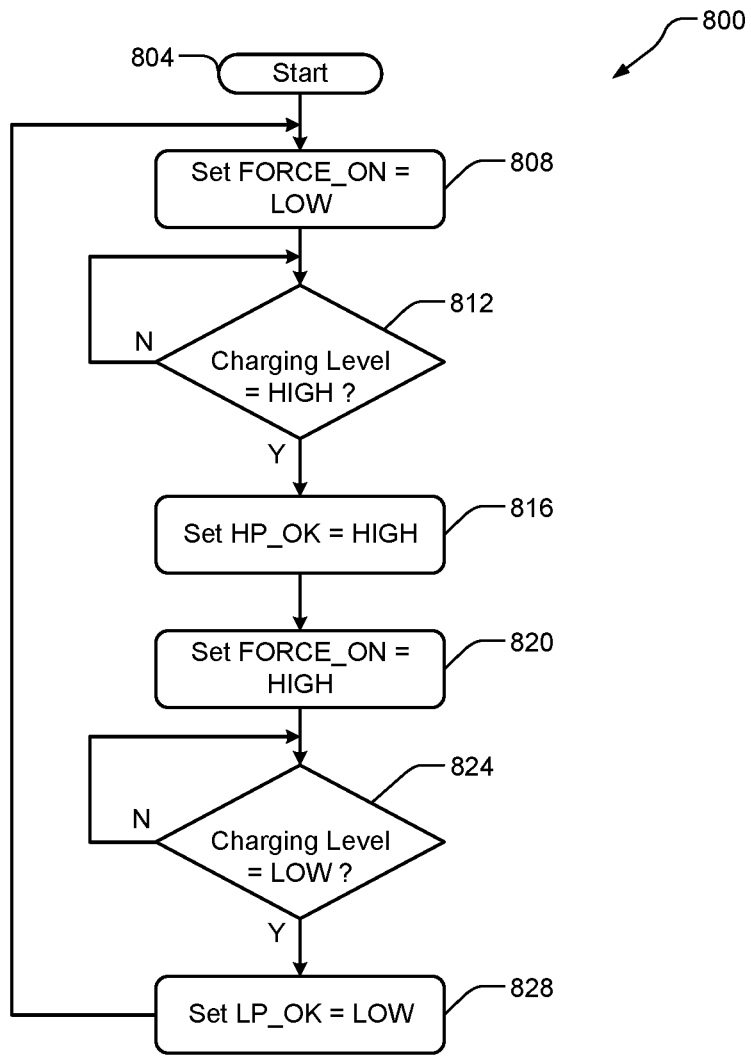

With reference to FIG. 7B, a flowchart describing an example control algorithm 800 for setting the operating mode of the dongle 56 is shown. The control algorithm 800 begins at 804 when, for example, the container controller 48 is turned on and receives sensor data representing various operational characteristics of the container 10. At 808, the control algorithm 800, using the converter network 80, sets the FORCE_ON signal low. When the FORCE_ON signal is set low, as also shown in FIG. 5B, the charging circuit 76 begins charging and a driver of the RS-232 device 162 is disabled, thereby preventing the RS-232 device from providing signals to the converter network 80. Furthermore, when FORCE_ON is set to low, the dongle 56 is set to the charging mode.

At 812, the control algorithm 800 determines, using the comparator network 138, whether the charging level of the charging circuit 76 is high. In other words, the control algorithm 800 determines whether a voltage value of the charging circuit is greater than the reference voltage of the comparator network 138. If so, the control algorithm 800 proceeds to 816; otherwise, the control algorithm 800 remains at 812 until the charging level of the charging circuit is high.

At 816, the control algorithm 800 sets, using the comparator network 138, HP_OK to a high value. In response to the converter network 80 receiving the high value via the HP_OK output, the converter network 80 is configured to begin receiving RS-232 signals from the RS-232 device 162. Furthermore, when HP_OK is set to high, the dongle 56 is set to the controller communication mode and the BLE communication mode. At 820, the control algorithm 800 sets, using the converter network 80, the FORCE_ON signal high, thereby activating the driver of the RS-232 device 162 and discontinuing the charging of the charging circuit 76. Moreover, the charging circuit 76 begins to discharge its stored voltage to the comparator network 138.

At 824, the control algorithm 800 determines, using the comparator network 138, whether the charging level of the charging circuit 76 is low. In other words, the control algorithm 800 determines whether a voltage value of the charging circuit is less than the reference voltage of the comparator network 138. If so, the control algorithm 800 proceeds to 828; otherwise, the control algorithm 800 remains at 824 until the charging level of the charging circuit is high.

At 828, the control algorithm 800 sets, using the comparator network 138, LP_OK to a low value. In response to the converter network 80 receiving the low value via the LP_OK output, the converter network 80 is configured to discontinue receiving RS-232 signals from the RS-232 device 162. The control algorithm 800 then proceeds to 808. The control algorithm 800 is configured to continuously operate and set the dongle 56 from the controller communication mode to the charging mode. Moreover and as described above, the dongle 56 is configured to remain in the BLE communication mode once the initial charging of the dongle 56 is complete.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a charging circuit implemented by a battery-less circuit;
a converter network; and
a voltage regulator that couples the charging circuit to the converter network;
the system being configured to operate in a charging mode and a communication mode, wherein:
when the system is in the charging mode, the charging circuit is configured to receive a serial communication signal that charges the charging circuit; and
when the system is in the communication mode, the voltage regulator is configured to limit an amount of voltage discharge from the charging circuit, and the converter network is configured to (i) receive the serial communication signal (ii) convert the serial communication signal to a second signal having a second type, the second type having a different communication protocol than the serial communication signal, and (iii) transmit the second signal to a remote device.

2. The system of claim 1, wherein the system is operable in an advertising Bluetooth low energy communication mode when a Bluetooth low energy advertising signal associated with a container includes an alarm value that indicates that an operating characteristic of the container is within a predefined tolerance.

3. The system of claim 1, wherein the system is operable in a connecting Bluetooth low energy communication mode when a Bluetooth low energy advertising signal associated with a container includes an alarm value that indicates that an operating characteristic of the container is not within a predefined tolerance.

4. The system of claim 3, wherein the system is operable in the communication mode in response to receiving an access request signal from the remote device.

5. The system of claim 1 further comprising a controller, the controller including a processor that is configured to execute instructions stored in a nontransitory memory, the processor configured to provide the serial communication signal to (i) the charging circuit in response to the system operating in the charging mode and (ii) to the converter network in response to the system operating in the communication mode.

6. The system of claim 1, wherein the converter network is configured to determine whether the system is operating in one of the charging mode and the communication mode.

7. The system of claim 1, wherein the serial communication signal represents a plurality of operational characteristics of a container.

8. The system of claim 7, wherein the operational characteristics include at least one of an electric power consumption of the container, a suction of the container, a discharge temperature of the container, a pressure of a compressor of the container, a pressure of a condenser of the container, and an evaporator temperature of the container.

9. The system of claim 1, wherein the second type is a Bluetooth low energy signal.

10. The system of claim 1, wherein the voltage regulator includes a shunt regulator circuit and a low drop-out voltage regulator circuit.

11. The system of claim 1, wherein the charging circuit includes a resistor-capacitor (RC) circuit.

12. The system of claim 1, wherein the remote device is configured to transmit a signal based on the second signal to at least one of a local monitoring system and a server using one of an ISO 10368 Power Line Interface, a power-line communication (PLC) protocol, and a cellular signal.

13. The system of claim 11, wherein the remote device is configured to transmit the signal using one of an ISO 10368 Power Line Interface, a power-line communication (PLC) protocol, and a cellular signal.

14. A method for operating a dongle, the method comprising:
   receiving, using a charging circuit implemented by a battery-less circuit that is coupled to a converter network by a voltage regulator and while in a charging mode, a serial communication signal;
   charging, using the serial communication signal and while in the charging mode, the charging circuit; and
   limiting, using the voltage regulator and while in a communication mode, an amount of voltage discharge from the charging circuit;
   receiving, using the converter network and while in the communication mode, the serial communication signal;
   converting, using the converter network and while in the communication mode, the serial communication signal to a second signal having a second type, the second type having a different communication protocol than the serial communication signal; and
   transmitting, using the converter network and while in the communication mode, the second signal to a remote device.

15. The method of claim 14, wherein the dongle is operable in an advertising Bluetooth low energy communication mode when a Bluetooth low energy advertising signal associated with a container includes an alarm value that indicates that an operating characteristic of the container is within a predefined tolerance.

16. The method of claim 14, wherein the dongle is operable in a connecting Bluetooth low energy communication mode when a Bluetooth low energy advertising signal associated with a container indicates that an operating characteristic of the container is not within a predefined tolerance.

17. The method of claim 16, wherein the dongle is operable in the communication mode in response to receiving an access request signal from the remote device.

18. The method of claim 14 further comprising providing, using a processor that is configured to execute instructions stored in a nontransitory memory, the serial communication signal to (i) the charging circuit in response to the dongle operating in the charging mode and (ii) to the converter network in response to the dongle operating in the communication mode.

19. A system comprising:
   a charging circuit;
   a converter network; and
   a voltage regulator that couples the charging circuit to the converter network;
   the system being configured to operate in a charging mode and a communication mode, wherein:
   when the system is in the charging mode, the charging circuit is configured to receive a serial communication signal that charges the charging circuit; and
   when the system is in the communication mode, the voltage regulator is configured to limit an amount of voltage discharge from the charging circuit, and the converter network is configured to (i) receive the serial communication signal (ii) convert the serial communication signal to a second signal having a second type, the second type having a different communication protocol than the serial communication signal, and (iii) transmit the second signal to a remote device;
   wherein the serial communication signal represents a plurality of operational characteristics of a container.

20. The system of claim 19, wherein the system is operable in a Bluetooth low energy communication mode when a Bluetooth low energy advertising signal associated with a container includes an alarm value that indicates that an operating characteristic of the container is within a predefined tolerance.

* * * * *